A. CLEIN.
COMBINED FOLDING SLED AND BABY CARRIAGE ATTACHMENT.
APPLICATION FILED JAN. 27, 1919.
1,328,715.
Patented Jan. 20, 1920.
2 SHEETS—SHEET 1.
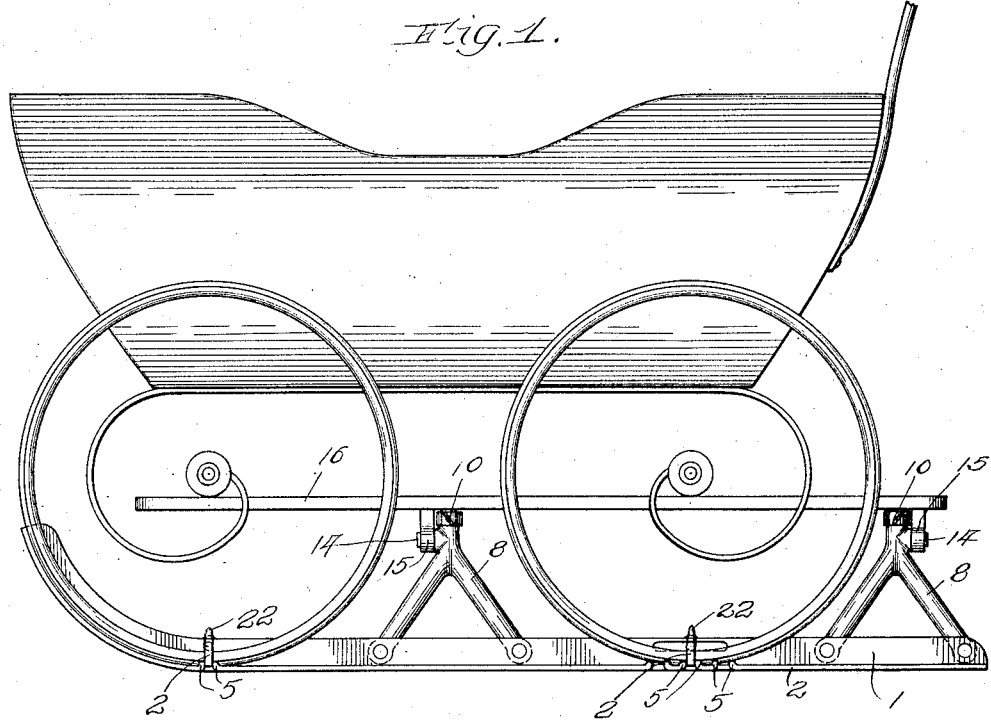
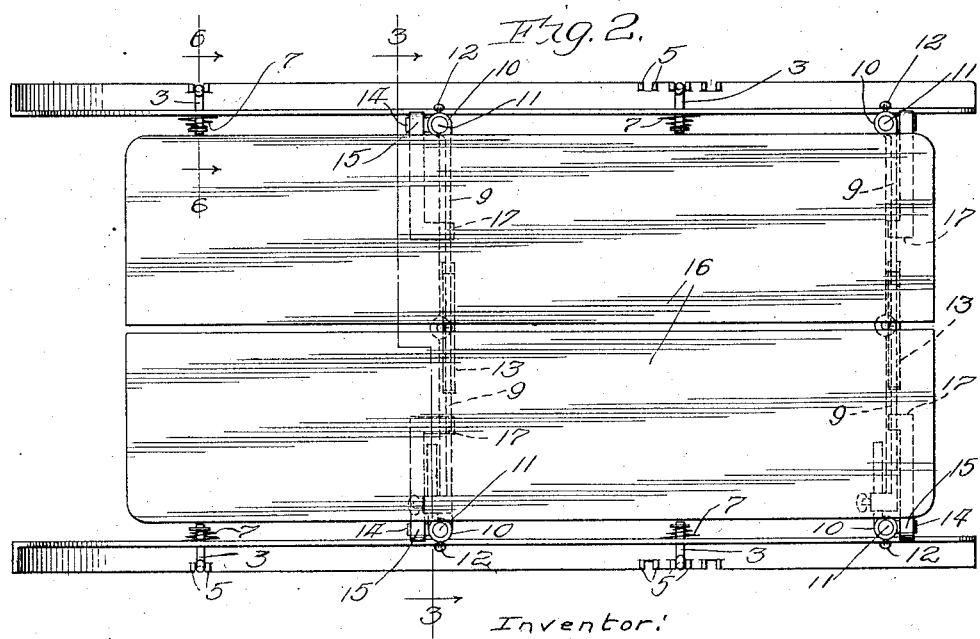
Witness:
R. L. Darrington
Inventor:
Adolph Clein
by Albert Scheible,
Attorney A. CLEIN.
COMBINED FOLDING SLED AND BABY CARRIAGE ATTACHMENT.
APPLICATION FILED JAN. 27, 1919.
1,328,715.
Patented Jan. 20, 1920.
2 SHEETS—SHEET 2.
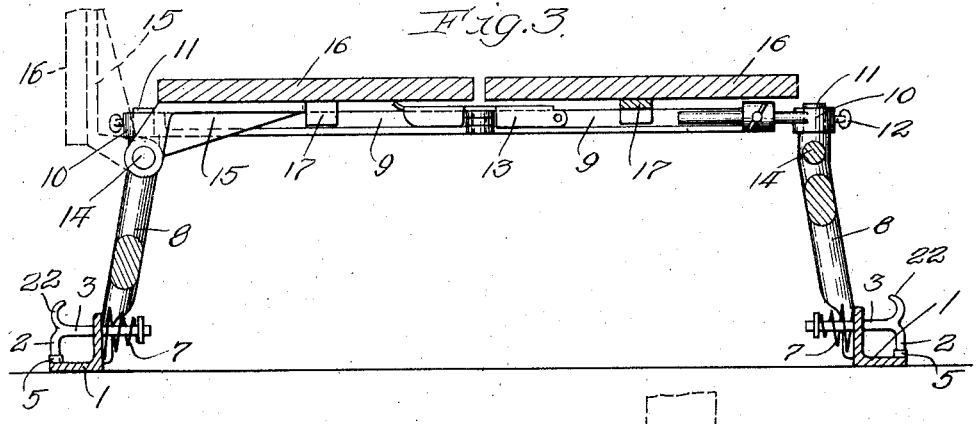
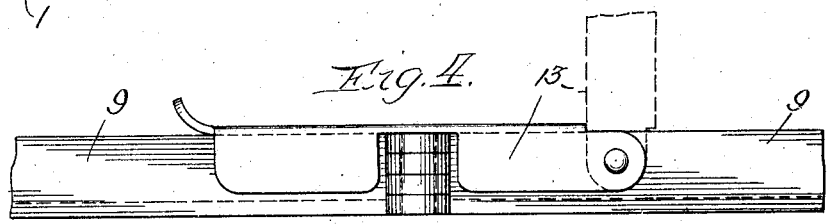
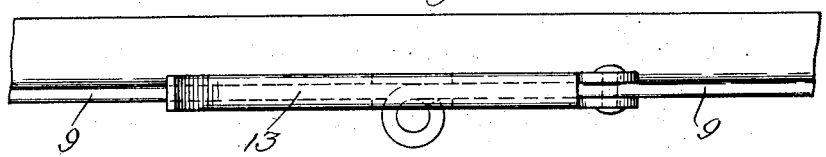
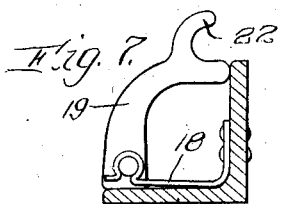
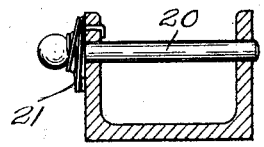
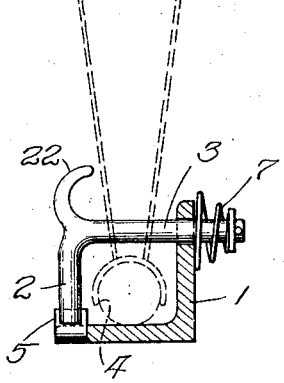
Witness:
R. L. Farrington
Inventor:
Adolph Clein
by Albert Scheibe,
Attorney

UNITED STATES PATENT OFFICE.

ADOLPH CLEIN, OF CHICAGO, ILLINOIS.

COMBINED FOLDING SLED AND BABY-CARRIAGE ATTACHMENT.

1,328,715.  Specification of Letters Patent.  Patented Jan. 20, 1920.

Application filed January 27, 1919. Serial No. 273,257.

*To all whom it may concern:*

Be it known that I, ADOLPH CLEIN, citizen of the United States, residing at Chicago, Illinois, have invented certain new and useful Improvements in Combined Folding Sled and Baby-Carriage Attachments; and I do hereby declare the following to be a full, clear, and exact description of the invention, such as will enable others skilled in the art to which it appertains to make and use the same.

In one of its general aspects, my invention relates to a runner attachment which may readily be attached to the wheels of a baby carriage to permit the carriage to be operated as a sled when snow is on the ground. In this aspect, my invention aims to provide runners which can easily be attached or detached without the use of tools, which will readily permit the attaching means to be adjusted to different lengths of wheel bases, which will automatically hold the attaching means in operative position, and which can easily be folded into a single and compact package for storage. Furthermore, my invention aims to provide suitable connections for such runners, whereby the runners will be maintained in proper transverse alinement with each other, and whereby the various parts will be permanently connected to avoid the possible loss or misplacing of a portion of the same.

In another aspect, my invention aims to provide a folding sled, for which purpose it aims to provide a sled in which the runners are connected by foldable means; to provide simple means for normally holding the foldable connections extended and in proper transverse disposition with respect to the runners; and to provide simple means for permitting the two halves of the seat portion of the sled to be swung substantially into alinement with the runners when the sled is compacted for convenient shipping or storing.

In still another aspect, my invention aims to provide a sled which also can conveniently be used as the running gear for an ordinary baby carriage, and which can readily be attached to, or detached from, a baby carriage without the use of tools and without dismantling the sled. Still further objects will appear from the following specification and from the accompanying drawings in which drawings—

Figure 1 is a side elevation showing my appliance when used as a runner for a baby carriage.

Fig. 2 is a plan view of my complete appliance when unattached to a vehicle.

Fig. 3 is an enlarged transverse section along the line 3—3 of Fig. 2.

Figs. 4 and 5 are enlarged elevations and plan views respectively, showing details of the hinge and latch construction used in connection with the folding cross cars.

Fig. 6 is an enlarged transverse section through the latching hook used on one of the runners of Fig. 1 for securing the rim of the wheel to the same.

Fig. 7 is a similar section showing another arrangement of the hook and spring element used for securing the rim of a wheel to an angle-sectioned runner.

Fig. 8 is a section showing a latching arrangement suitable for securing the rim of a wheel to a channel-sectioned runner.

Referring first to the use of my invention in connection with baby carriages, I provide two runners, each curved upward at their forward ends, and each including a flat bottom portion and a vertical web. These runners may either be made of angle steel, as shown in the first seven figures of my drawings, or may be made of channel steel as shown in Fig. 8. Each of these runners is longer in its uncurved portion than the wheel base of the average baby carriage, and is equipped with a pair of hooks adapted to engage the rims of the two wheels at one side of the carriage when these wheels rest upon the horizontal portion of the runner. For this purpose, I desirably provide a hook member adapted to be moved into or out of a position in which it holds the rim of the wheel between itself and the vertical web of the angle-sectioned runner, and normally held in such a position by means of a spring. For example, I may employ a rod extending through a perforation in the vertical web 1 of the runner and terminating in a portion 2 bent substantially at right angles to the main portion 3 of this rod and therefore adapted to extend toward the horizontal portion 4 of the runner. Then I may bend lugs 5 upwardly from the base portion 4 of the runner, these lugs being spaced from each other so that the tip of the downward hook portion 2 can readily slide in between the same when the sliding shank 3 of the hook is drawn back into the position of Fig. 6 by a spring 7. In using such a hook, the portion engaged with the lugs can readily be released by pulling on the handle 22 of Fig. 6, after which the hook can be rotated a quarter turn, thereby permitting the rim of the wheel to be slipped in between the shank 3 and the base 4 of the runner. Then when the hook is turned back to its normal position and the pressure is released, the spring 7 will snap the tip of the portion 2 between the lugs 5, thereby enabling the spring 7 and the lug 5 to coöperate in holding the hook in its normal position.

Where such a runner is to be used interchangeably with different sizes or makes of baby carriages, I desirably elongate the perforation through which one of these hook bolts extends, and provide a series of pairs of lugs as shown at the right hand wheel of Fig. 1, thereby permitting an adjustment to correspond to different lengths of wheel bases. With the runners thus equipped, it will be obvious that the same can be attached to the two sides of the baby carriage very quickly and without the use of tools, that the runners can likewise be detached almost instantly, and that they be conveniently stored in a small space when not in service.

Instead of limiting the use of the runners to connection with a vehicle, I desirably also use these as parts of a sled, and preferably of a sled which can be folded for compact storing or carrying. With this in mind, I mount on each of the runners a pair of risers 8, each of which risers has at or near its upper end a pivot-mounting for one end of a folding cross bar. Each of the two cross-bars desirably consists of a pair of angle steel members 9 hinged to each other and equipped at their free ends with sockets 10 slipped over the pivot pins 11 on the risers 8, so as to afford the said pivotal connection. The tips of the pins 11 may be staked over so as to prevent the socket ends of the cross bars from slipping off the same, and I may provide thumb screws 12 for locking these sockets against turning on their pivotal mountings. However, I preferably do not depend on screws for this purpose, but also provide other means for preventing the two parts of the cross-bar from shifting in angular relation with respect to each other and with respect to the runners. For example, I may attach a pivot latch 13 to one of the cross-bar members 9, as shown in Figs. 4 and 5, this latching consisting of a metal stirrup slidably fitting over the vertical webs of the two angle-sectioned cross-bar members 9 when in normal position and therefore keeping these two parts rigidly in alinement, but leaving the cross-bar free to be folded when the latch 13 is swung out of its locking position as indicated in dotted lines in Fig. 4.

I also desirably employ the same runners 8 as supports for the seat of a sled. For this purpose, each riser may also carry a horizontally disposed pivot pin 14 which serves as the axis for a corresponding socket on a bracket 15 secured to a board 16 which forms one-half of the horizontal seat of the sled. Each of the brackets 15 may also include a pair of lugs 17 spaced from each other by a distance corresponding to the thickness of the vertical web of the cross bar parts 9 and adapted to hook over the adjacent web when the bracket is in its normal position as shown in Fig. 3. Consequently, the bracket when thus equipped will automatically latch the cross bar parts, so as to prevent their moving out of a position at right angles to the plane of the vertical webs of the runners.

Thus equipped, it will be obvious from the drawings that the entire sled arrangement will not interfere in any way with the securing of the runners to the wheels of a baby carriage or the like. Consequently, my appliance can readily be used as a runner for this purpose, or the wheels of the carriage can instantly be detached from the runners to permit the sled to be used by itself. To allow for this more readily, and to compensate for different widths of the carriages, I preferably make one section of the cross-bar adjustable in length, as shown for example at the right hand of Fig. 3. Then when my appliance is not in use, the seat portions of the sled can readily be swung into substantially vertical planes, as indicated in dotted lines at the left hand of Fig. 3 and the cross-bars can be folded between the risers, thus compacting the entire appliance into a narrow form in which it can be cheaply shipped and in which it can be conveniently stored in a small space.

However, I do not wish to be limited to the details of construction and arrangement as above disclosed; it being obvious that the same might be varied in many ways without departing from the spirit of my invention. For example, instead of mounting one of the rim latching hooks slidably on the vertical web of the runner, I may use a spring 18 both as the pivotal mounting for a rocking hook 19 and as means for normally holding this hook in its operative position, as shown in Fig. 7. Or, where the runner is made of channel steel, I may use a pin 20 sliding through perforations in both of the vertical webs and normally held in position by a spring 21.

I claim as my invention:

1. A combined child's sled and baby-carriage runner, comprising a sled having two angle-sectioned runners each having an outwardly directed web underhanging and directly supporting the pair of wheels at one side of the baby-carriage, two pairs of risers respectively secured to the opposed faces of the two runners but unsecured to the baby-carriage, foldable cross-bars connecting opposite risers on the two runners, and a sled seat carried jointly by the risers and the cross-bars and disposed under the vehicle, yielding means for detachably securing each of the said outwardly directed runner webs to the wheels supported thereby, and means carried by the said sled seat for maintaining the cross-bars unfolded and thereby coöperating with the said securing means in affording a rigid support for the vehicle.

2. In a foldable sled, a pair of runner members, foldable cross-bars pivotally connected at their ends to the two runner members and extending transversely of the runner members, a pair of rigid seat halves hinged respectively to the runner members and normally resting upon the cross-bars, and means carried by the seat halves and interlocking with adjacent parts of the cross-bars to maintain the latter rigidly unfolded and transverse of the sled.

3. In a foldable sled, a pair of runner members, foldable cross-bars pivotally connected at their ends to the two runner members, releasable means for normally maintaining the cross-bars unfolded and at right angles to the runner members, two pairs of risers respectively fast upon the runners and sloping inwardly of the sled, brackets pivoted to the risers on horizontal pivots, and seat halves respectively secured to the brackets at each side of the sleds and normally supported jointly by the said brackets and by the unfolded cross-bars, the brackets being formed for swinging the seat halves outwardly of the risers and over the runners to permit the cross-bars to be folded closely when the sled is compacted for storage.

4. For use with a vehicle, a pair of runners each adapted to support the pair of wheels at one side of the vehicle, means for detachably securing each wheel to the runner adjacent thereto, foldable cross-bars connecting the runners, and means upon each cross-bar for adjusting the length thereof.

5. For detachable use with a baby-carriage, a sled having a seat supported by risers, angle-sectioned runners fast upon the risers and having horizontal webs directed laterally outwardly of the sled, the said runners being spaced for respectively supporting the wheels at the two sides of the baby-carriage, and latching means carried by the runners for detachably securing the carriage wheels directly thereto.

Signed at Chicago, Illinois, January 23, 1919.

ADOLPH CLEIN.